United States Patent
Raghuvir (10) Patent No.: US 10,121,472 B2
(45) Date of Patent: Nov. 6, 2018

(54) AUDIO BUFFER CATCH-UP APPARATUS AND METHOD WITH TWO MICROPHONES

(71) Applicant: Knowles Electronics, LLC, Itasca, IL (US)

(72) Inventor: Ramanujapuram Raghuvir, Oak Brook, IL (US)

(73) Assignee: Knowles Electronics, LLC, Itasca, IL (US)

(*) Notice: Subject to any disclaimer, the term of this patent is extended or adjusted under 35 U.S.C. 154(b) by 6 days.

(21) Appl. No.: 15/016,748

(22) Filed: Feb. 5, 2016

(65) Prior Publication Data

US 2016/0240192 A1 Aug. 18, 2016

Related U.S. Application Data (60) Provisional application No. 62/115,898, filed on Feb. 13, 2015.

(51) Int. Cl.
*H03G 3/20* (2006.01)
*G10L 15/22* (2006.01)
(Continued)

(52) U.S. Cl.
CPC .............. *G10L 15/22* (2013.01); *G10L 15/32* (2013.01); *G10L 25/78* (2013.01); *H04R 3/005* (2013.01);
(Continued)

(58) Field of Classification Search
CPC ......... G10L 15/22; G10L 15/32; G10L 25/78; G10L 2015/088; G10L 2015/223; H04R 3/005; H04R 2201/003
See application file for complete search history.

(56) References Cited

U.S. PATENT DOCUMENTS

| 4,052,568 A | 10/1977 | Jankowski |
| 5,577,164 A | 11/1996 | Kaneko |

(Continued)

FOREIGN PATENT DOCUMENTS

| JP | 2001236095 | 8/2001 |
| JP | 2004219728 | 8/2004 |

(Continued)

OTHER PUBLICATIONS

U.S. Appl. No. 14/285,585, filed May 22, 2014, Santos.

(Continued)

*Primary Examiner* — Regina N. Holder
(74) *Attorney, Agent, or Firm* — Foley & Lardner LLP (57) ABSTRACT

A first microphone is operated in a low power sensing mode, and a buffer at the first microphone is used to temporarily store at least some of the phrase. Subsequently the first microphone is deactivated, then the first microphone is re-activated to operate in normal operating mode where the buffer is no longer used to store the phrase. The first microphone forms first data that does not include the entire phrase. A second microphone is maintained in a deactivated mode until the trigger portion is detected in the first data, and when the trigger portion is detected, the second microphone is caused to operate in normal operating mode where no buffer is used. The second microphone forms second data that does not include the entire phrase. A first electronic representation of the phrase as received at the first microphone and a second electronic representation of the phrase as received at the second microphone are formed from selected portions of the first data and the second data.

22 Claims, 4 Drawing Sheets

(51) Int. Cl.
  *G10L 25/78* (2013.01)
  *H04R 3/00* (2006.01)
  *G10L 15/32* (2013.01)
  *G10L 15/08* (2006.01)

(52) U.S. Cl.
  CPC .. *G10L 2015/088* (2013.01); *G10L 2015/223* (2013.01); *H04R 2201/003* (2013.01)

(56) References Cited

U.S. PATENT DOCUMENTS

| | | |
|---|---|---|
| 5,598,447 A | 1/1997 | Usui |
| 5,675,808 A | 10/1997 | Gulick |
| 5,822,598 A | 10/1998 | Lam |
| 5,983,186 A | 11/1999 | Miyazawa |
| 6,049,565 A | 4/2000 | Paradine |
| 6,057,791 A | 5/2000 | Knapp |
| 6,070,140 A | 5/2000 | Tran |
| 6,154,721 A | 11/2000 | Sonnic |
| 6,249,757 B1 | 6/2001 | Cason |
| 6,282,268 B1 | 8/2001 | Hughes |
| 6,324,514 B2 | 11/2001 | Matulich |
| 6,397,186 B1 | 5/2002 | Bush |
| 6,453,020 B1 | 9/2002 | Hughes |
| 6,564,330 B1 | 5/2003 | Martinez |
| 6,591,234 B1 | 7/2003 | Chandran |
| 6,640,208 B1 | 10/2003 | Zhang |
| 6,756,700 B2 | 6/2004 | Zeng |
| 7,190,038 B2 | 3/2007 | Dehe |
| 7,415,416 B2 | 8/2008 | Rees |
| 7,473,572 B2 | 1/2009 | Dehe |
| 7,619,551 B1 | 11/2009 | Wu |
| 7,630,504 B2 | 12/2009 | Poulsen |
| 7,774,202 B2 | 8/2010 | Spengler |
| 7,774,204 B2 | 8/2010 | Mozer |
| 7,781,249 B2 | 8/2010 | Laming |
| 7,795,695 B2 | 9/2010 | Weigold |
| 7,825,484 B2 | 11/2010 | Martin |
| 7,829,961 B2 | 11/2010 | Hsiao |
| 7,856,283 B2 | 12/2010 | Burk |
| 7,856,804 B2 | 12/2010 | Laming |
| 7,903,831 B2 | 3/2011 | Song |
| 7,936,293 B2 | 5/2011 | Hamashita |
| 7,941,313 B2 | 5/2011 | Garudadri |
| 7,957,972 B2 | 6/2011 | Huang |
| 7,994,947 B1 | 8/2011 | Ledzius |
| 8,171,322 B2 | 5/2012 | Fiennes |
| 8,208,621 B1 | 6/2012 | Hsu |
| 8,275,148 B2 * | 9/2012 | Li .................. H04R 3/005 381/92 |
| 8,331,581 B2 | 12/2012 | Pennock |
| 8,666,751 B2 | 3/2014 | Murthi |
| 8,687,823 B2 | 4/2014 | Loeppert |
| 8,731,210 B2 | 5/2014 | Cheng |
| 8,798,289 B1 | 8/2014 | Every |
| 8,804,974 B1 | 8/2014 | Melanson |
| 8,849,231 B1 | 9/2014 | Murgia |
| 8,972,252 B2 | 3/2015 | Hung |
| 8,996,381 B2 | 3/2015 | Mozer |
| 9,020,819 B2 | 4/2015 | Saitoh |
| 9,043,211 B2 | 5/2015 | Haiut |
| 9,059,630 B2 | 6/2015 | Gueorguiev |
| 9,073,747 B2 | 7/2015 | Ye |
| 9,076,447 B2 | 7/2015 | Nandy |
| 9,111,548 B2 | 8/2015 | Nandy |
| 9,112,984 B2 | 8/2015 | Sejnoha |
| 9,113,263 B2 | 8/2015 | Furst |
| 9,119,150 B1 | 8/2015 | Murgia |
| 9,142,215 B2 | 9/2015 | Rosner |
| 9,147,397 B2 | 9/2015 | Thomsen |
| 9,161,112 B2 | 10/2015 | Ye |
| 2002/0054588 A1 | 5/2002 | Mehta |
| 2002/0116186 A1 | 8/2002 | Strauss |
| 2002/0123893 A1 | 9/2002 | Woodward |
| 2002/0184015 A1 | 12/2002 | Li |
| 2003/0004720 A1 | 1/2003 | Garudadri |
| 2003/0061036 A1 | 3/2003 | Garudadri |
| 2003/0144844 A1 | 7/2003 | Colmenarez |
| 2004/0022379 A1 | 2/2004 | Klos |
| 2005/0207605 A1 | 9/2005 | Dehe |
| 2006/0074658 A1 | 4/2006 | Chadha |
| 2006/0233389 A1 | 10/2006 | Mao |
| 2006/0247923 A1 | 11/2006 | Chandran |
| 2007/0168908 A1 | 7/2007 | Paolucci |
| 2007/0278501 A1 | 12/2007 | MacPherson |
| 2008/0089536 A1 | 4/2008 | Josefsson |
| 2008/0175425 A1 | 7/2008 | Roberts |
| 2008/0201138 A1 | 8/2008 | Visser |
| 2008/0267431 A1 | 10/2008 | Leidl |
| 2008/0279407 A1 | 11/2008 | Pahl |
| 2008/0283942 A1 | 11/2008 | Huang |
| 2009/0001553 A1 | 1/2009 | Pahl |
| 2009/0180655 A1 | 7/2009 | Tien |
| 2010/0046780 A1 | 2/2010 | Song |
| 2010/0052082 A1 | 3/2010 | Lee |
| 2010/0057474 A1 | 3/2010 | Kong |
| 2010/0128894 A1 | 5/2010 | Petit |
| 2010/0128914 A1 | 5/2010 | Khenkin |
| 2010/0131783 A1 | 5/2010 | Weng |
| 2010/0183181 A1 | 7/2010 | Wang |
| 2010/0246877 A1 | 9/2010 | Wang |
| 2010/0290644 A1 | 11/2010 | Wu |
| 2010/0292987 A1 | 11/2010 | Kawaguchi |
| 2010/0322443 A1 | 12/2010 | Wu |
| 2010/0322451 A1 | 12/2010 | Wu |
| 2011/0007907 A1 | 1/2011 | Park |
| 2011/0013787 A1 | 1/2011 | Chang |
| 2011/0029109 A1 | 2/2011 | Thomsen |
| 2011/0075875 A1 | 3/2011 | Wu |
| 2011/0106533 A1 | 5/2011 | Yu |
| 2011/0208520 A1 | 8/2011 | Lee |
| 2011/0280109 A1 | 11/2011 | Raymond |
| 2012/0010890 A1 | 1/2012 | Koverzin |
| 2012/0232896 A1 | 9/2012 | Taleb |
| 2012/0250881 A1 | 10/2012 | Mulligan |
| 2012/0310641 A1 | 12/2012 | Niemisto |
| 2013/0044898 A1 | 2/2013 | Schultz |
| 2013/0058506 A1 | 3/2013 | Boor |
| 2013/0223635 A1 | 8/2013 | Singer |
| 2013/0226324 A1 | 8/2013 | Hannuksela |
| 2013/0246071 A1 | 9/2013 | Lee |
| 2013/0322461 A1 | 12/2013 | Poulsen |
| 2013/0343584 A1 | 12/2013 | Bennett |
| 2014/0064523 A1 | 3/2014 | Kropfitsch |
| 2014/0122078 A1 | 5/2014 | Joshi |
| 2014/0143545 A1 | 5/2014 | McKeeman |
| 2014/0163978 A1 | 6/2014 | Basye |
| 2014/0177113 A1 | 6/2014 | Gueorguiev |
| 2014/0188467 A1 | 7/2014 | Jing |
| 2014/0188470 A1 | 7/2014 | Chang |
| 2014/0197887 A1 | 7/2014 | Hovesten |
| 2014/0214429 A1 | 7/2014 | Pantel |
| 2014/0244269 A1 | 8/2014 | Tokutake |
| 2014/0244273 A1 | 8/2014 | Laroche |
| 2014/0249820 A1 | 9/2014 | Hsu |
| 2014/0257813 A1 | 9/2014 | Mortensen |
| 2014/0257821 A1 | 9/2014 | Adams |
| 2014/0274203 A1 | 9/2014 | Ganong |
| 2014/0278435 A1 | 9/2014 | Ganong |
| 2014/0281628 A1 | 9/2014 | Nigam |
| 2014/0343949 A1 | 11/2014 | Huang |
| 2014/0348345 A1 | 11/2014 | Furst |
| 2014/0358552 A1 | 12/2014 | Xu |
| 2015/0039303 A1 | 2/2015 | Lesso |
| 2015/0043755 A1 | 2/2015 | Furst |
| 2015/0046157 A1 | 2/2015 | Wolff |
| 2015/0046162 A1 | 2/2015 | Aley-Raz |
| 2015/0049884 A1 | 2/2015 | Ye |
| 2015/0055803 A1 | 2/2015 | Qutub |
| 2015/0058001 A1 | 2/2015 | Dai |
| 2015/0063594 A1 | 3/2015 | Nielsen |
| 2015/0073780 A1 | 3/2015 | Sharma |
| 2015/0073785 A1 | 3/2015 | Sharma |
| 2015/0088500 A1 | 3/2015 | Conliffe |

(56) References Cited

U.S. PATENT DOCUMENTS

| | | |
|---|---|---|
| 2015/0106085 A1 | 4/2015 | Lindahl |
| 2015/0110290 A1 | 4/2015 | Furst |
| 2015/0112690 A1 | 4/2015 | Guha |
| 2015/0134331 A1 | 5/2015 | Millet |
| 2015/0154981 A1 | 6/2015 | Barreda |
| 2015/0161989 A1 | 6/2015 | Hsu |
| 2015/0195656 A1 | 7/2015 | Ye |
| 2015/0206527 A1 | 7/2015 | Connolly |
| 2015/0256660 A1 | 9/2015 | Kaller |
| 2015/0256916 A1 | 9/2015 | Volk |
| 2015/0287401 A1 | 10/2015 | Lee |
| 2015/0302865 A1 | 10/2015 | Pilli |
| 2015/0304502 A1 | 10/2015 | Pilli |
| 2015/0350760 A1 | 12/2015 | Nandy |
| 2015/0350774 A1 | 12/2015 | Furst |
| 2016/0012007 A1 | 1/2016 | Popper |
| 2016/0087596 A1 | 3/2016 | Yurrtas |
| 2016/0133271 A1 | 5/2016 | Kuntzman |
| 2016/0134975 A1 | 5/2016 | Kuntzman |
| 2016/0196838 A1* | 7/2016 | Rossum ............... H04R 29/004 381/97 |

FOREIGN PATENT DOCUMENTS

| | | |
|---|---|---|
| KR | 1020120112325 A | 10/2012 |
| WO | 2009130591 | 1/2009 |
| WO | 2011106065 | 1/2011 |
| WO | 2011140096 | 2/2011 |
| WO | 2013049358 | 1/2013 |
| WO | 2013085499 | 1/2013 |

OTHER PUBLICATIONS

U.S. Appl. No. 14/495,482, filed Sep. 24, 2014, Murgia.
U.S. Appl. No. 14/522,264, filed Oct. 23, 2014, Murgia.
U.S. Appl. No. 14/698,652, filed Apr. 28, 2015, Yapanel.
U.S. Appl. No. 14/749,425, filed Jun. 24, 2015, Verma.
U.S. Appl. No. 14/853,947, filed Sep. 14, 2015, Yen.
U.S. Appl. No. 62/100,758, filed Jan. 7, 2015, Rossum.
"MEMS technologies: Microphone" EE Herald Jun. 20, 2013.
Delta-sigma modulation, Wikipedia (Jul. 4, 2013).
International Search Report and Written Opinion for PCT/EP2014/064324, dated Feb. 12, 2015 (13 pages).
International Search Report and Written Opinion for PCT/US2014/038790, dated Sep. 24, 2014 (9 pages).
International Search Report and Written Opinion for PCT/US2014/060567 dated Jan. 16, 2015 (12 pages).
International Search Report and Written Opinion for PCT/US2014/062861 dated Jan. 23, 2015 (12 pages).
International Search Report and Written Opinion for PCT/US2016/013859 dated Apr. 29, 2016 (12 pages).
Kite, Understanding PDM Digital Audio, Audio Precision, Beaverton, OR, 2012.
Pulse-density modulation, Wikipedia (May 3, 2013).
Search Report of Taiwan Patent Application No. 103135811, dated Apr. 18, 2016 (1 page).
International Search Report and Written Opinion for International Application No. PCT/US2016/017110 dated May 26, 2016 (15 pages).

* cited by examiner

AUDIO BUFFER CATCH-UP APPARATUS AND METHOD WITH TWO MICROPHONES

CROSS-REFERENCE TO RELATED APPLICATION

This patent claims benefit under 35 U.S.C. § 119(e) to U.S. Provisional Application No. 62/115,898 entitled "Audio Buffer Catch-up Apparatus and Method with Two Microphones" filed Feb. 13, 2015, the content of which is incorporated herein by reference in its entirety.

TECHNICAL FIELD

This application relates to microphones and, more specifically, to approaches for operating these microphones.

BACKGROUND

Microphones are used to obtain a voice signal from a speaker. Once obtained, the signal can be processed in a number of different ways. A wide variety of functions can be provided by today's microphones and they can interface with and utilize a variety of different algorithms.

Voice triggering, for example, as used in mobile systems is an increasingly popular feature that customers wish to use. For example, a user may wish to speak commands into a mobile device and have the device react in response to the commands. In these cases, a voice activity detector may first detect whether there is voice in an audio signal captured by a microphone, and then, subsequently, analysis is performed on the signal to predict what the spoken word was in the received audio signal. Various voice activity detection (VAD) approaches have been developed and deployed in various types of devices such as cellular phones and personal computers.

Microphones that are always on are often equipped with internal oscillators and operate at very low power. Low power microphones are used in various applications and sometimes two or more microphones are used when the device is brought out of the low power mode. Although the low power aspect allows some of the microphones to be on all the time in a low power listening mode, the microphones may also use buffers to aid in voice activity detection, which introduce processing delays. The processing delays may cause problems at the far end of the system where the signals frequently need to be processed as quickly as possible.

The problems of previous approaches have resulted in some user dissatisfaction with these previous approaches.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

The present approaches utilize two (or potentially more) microphones to obtain speech phrases from an utterance of a speaker. The effects of delays caused by buffers in one of the microphones are significantly reduced or eliminated. The approaches described herein are easy to implement and eliminate problems and limitations associated with prior approaches.

Figure 1:
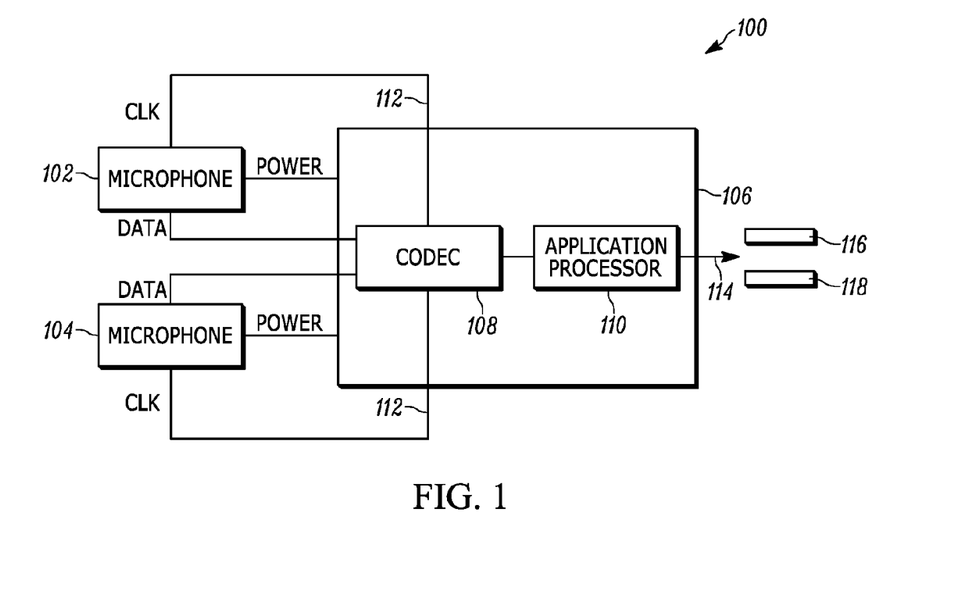
FIG. 1 comprises a system using two microphones that implements an audio buffer catch-up approach.

Referring now to FIG. 1, one example of a system 100 for audio buffer catch-up is described. The system 100 includes a first microphone 102 (a microphone with a built in voice activity detector, manufactured by Knowles, Inc., in one example), a second microphone 104 (a pulse density modulation (PDM) microphone, in one example), and a processor 106. The processor 106 may include a codec 108 and an application processor 110.

The first microphone 102 and second microphone 104 may be micro electro mechanical system (MEMS) microphones. In one example, these microphones are assemblies including a sensing element (diaphragm and back plate) and an application specific integrated circuit (which includes a buffer in the case of microphone 102 and potentially performs other processing functions). Sound energy is received by the microphones, moves the diaphragms and produces an electrical signal (which may or may not be buffered).

The processing device 106 may include a codec 108 and an application processor 110. The codec 108 in this example may supply the clock signals to the microphones 102 and 104, and may perform other signal processing functions. The application processor 110 may also perform processing related to the device in which the microphones 102 and 104 are deployed. For example, if the microphones 102 and 104 are deployed in a cellular phone, the application processor 110 may perform processing associated with the cellular phone. Although both a codec 108 and an application processor 110 are shown here, it will be appreciated that these devices can be merged together into a single processing device.

A clock signal 112 is applied to the microphones. Application of the clock signal, when applying the power signal to the microphone, causes the first microphone 102 to operate in a normal operating mode where incoming data to the ASIC is not buffered, but passed through to the output of the microphone 102. Non-application of the clock signal after power has been applied to the microphone, causes the first microphone 102 to operate in a low power operating mode. In this mode, incoming data to the ASIC is buffered and not directly passed through to the output of the microphone 102, thereby introducing a buffering delay, in one example of 256 milliseconds. The clock signal may be applied at one frequency when the microphone is in low power mode after acoustic activity has been detected and may be applied at the same or different frequency in the normal operating mode.

In one example of the operation of the system of FIG. 1, the first microphone 102 is on and uses its buffer (i.e., incoming audio data must pass through the buffer). The second microphone 104 is off. Incomplete segments of a phrase (e.g., OK GOOGLE NOW, WHAT IS THE WEATHER TODAY?) are received by at least one, and in some embodiments both, microphones 102 and 104. When the processing device 106 detects speech in data provided by the first microphone, the second microphone 104 is activated and begins to provide unbuffered (real time) data to the processing device. The second microphone may be activated by applying the clock signal 112 to the second microphone 104.

In one embodiment, the processing device determines whether the phrase includes a trigger phrase (e.g., OK GOOGLE NOW) within a phrase segment received at the first microphone 102. By "trigger phrase", it is meant any phrase that signifies that a command is immediately present after the trigger phrase. The second microphone 104 is turned on by the processor 106 as a result of the trigger phrase having been detected at the first microphone; the second microphone 104 after activation captures voice data in real time.

In one embodiment, the first microphone 102 is turned off by the processor 106 after a time period of (delay+x) where delay is the buffering delay of the first microphone 102 and x is the period of common speech information that has been received at each of the microphones 102 and 104. In one example, x can be determined by the algorithm required to calibrate the two microphones. This calibration may include determination of and compensation for the acoustic delay and gain difference between microphones 102 and 104. In embodiments where the first microphone is turned off, the first microphone is quickly turned back on after being turned off (e.g., within approximately 20 milliseconds) and placed in a normal mode of operation by receiving a clock signal 112 from the processor 106.

As will be more fully apparent from the discussion below, at least one and in some cases both microphones do not detect the entire uttered phase (e.g., OK GOOGLE NOW, WHAT IS THE WEATHER TODAY?) and thus the one or more microphones do not provide data derived from or corresponding to the entire phrase to the processor 106 for further processing. At the processor 106, the entire phrase (e.g., OK GOOGLE NOW, WHAT IS THE WEATHER TODAY?) is stitched together for each microphone 102 and 104 based upon information received from both microphones. An output 114 from processor 106 includes assembled phrases 116 and 118 (e.g., each being OK GOOGLE NOW, WHAT IS THE WEATHER TODAY?) with the first phrase 116 being associated with the first microphone 102 and the second phrase 118 being associated with the second microphone 104. It will be appreciated that this various processing described above can occur at either the codec 108 or the application processor 110, or at other processing devices (not shown in FIG. 1).

Figure 2:
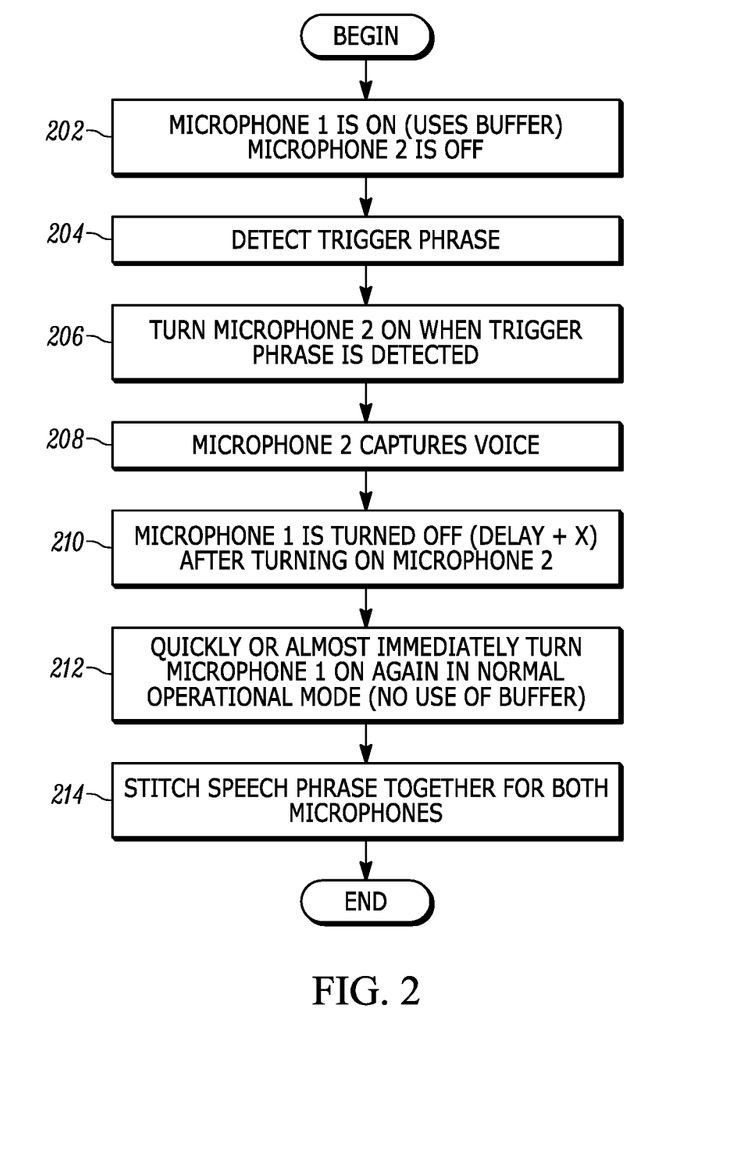
FIG. 2 comprises a flowchart showing an audio buffer catch-up approach.

Referring now to FIG. 2, one example of an approach for audio buffer catch-up is described. This processing occurs at the processor 106 (and in one specific example at the codec 108 although this functionality can be moved to or shared with the application processor 110).

At step 202, the first microphone is on and uses the buffer. The second microphone is off.

At step 204, the trigger phrase is detected from data received from the first microphone. At step 206, the second microphone is turned on as a result of the trigger phrase having been detected. At step 208, the second microphone captures voice data in real time.

At step 210, the first microphone is turned off after a time period of (delay+x) where the delay is the buffering delay of the first microphone (i.e., how long data takes to move through its buffer) and x is the period of common speech between the two microphones. In one example, x can be determined by the algorithm required to calibrate the two microphones.

At step 212, the first microphone is quickly turned on after being turned off (e.g., the microphone is activated approximately 20 milliseconds after being deactivated) and placed in a normal mode of operation (i.e., a non-buffering mode of operation as explained elsewhere herein). At step 214, data derived from segments of the phrase received by the plural microphones are stitched together using suitable algorithms to form electronic representations of the entire phrase, one associated with each microphone. One example of assembling data from different microphones to form two separate electronic representations of complete phrases (one for first microphone and the other for the second microphone) is described below with respect to FIGS. 3 and 4.

Figure 3:
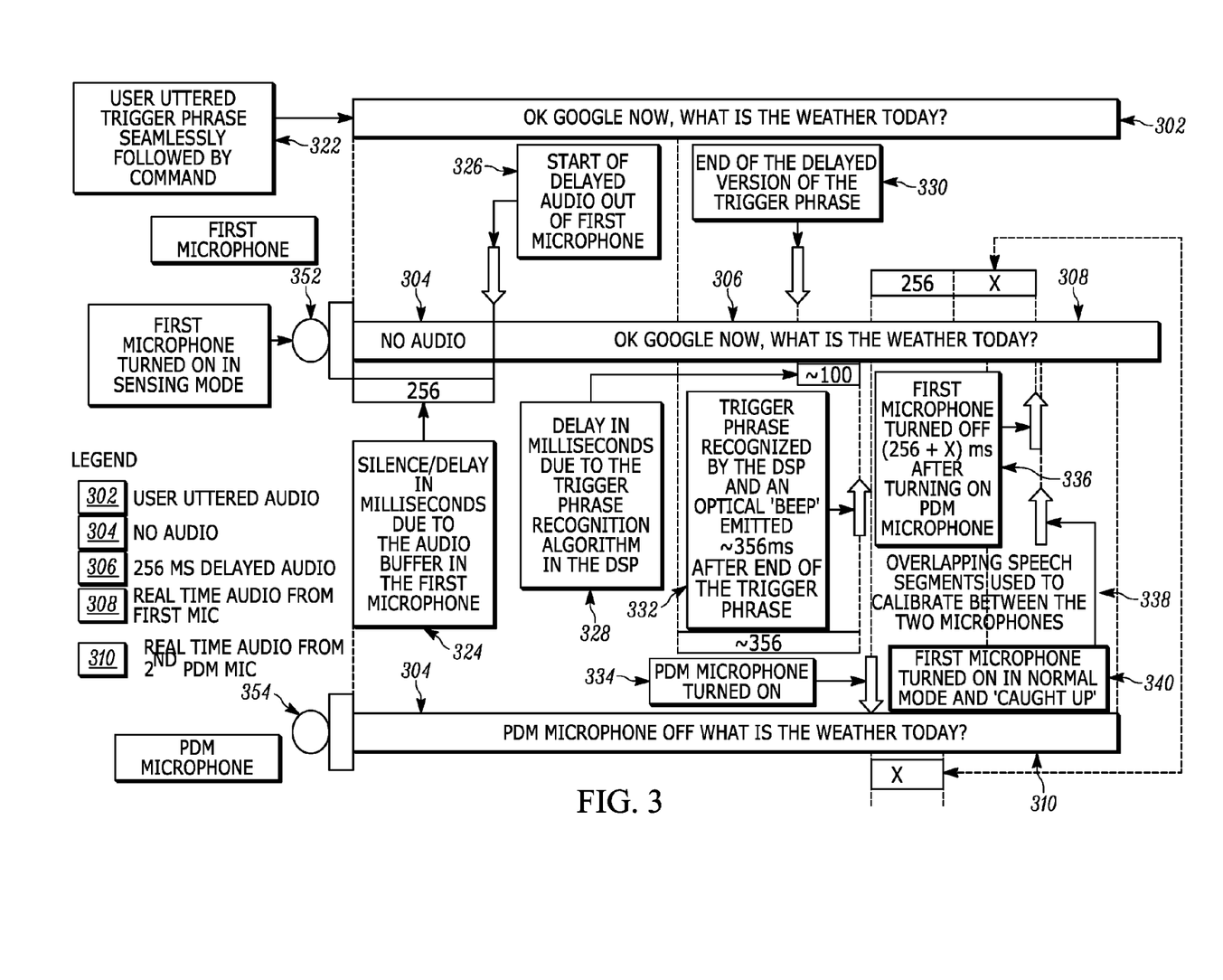
FIG. 3 comprises a time line and flowchart showing one example of an audio buffer catch-up approach.

Referring now to FIG. 3, one example of an approach for audio catch-up using two microphones is described. It will be appreciated that this is one example of an approach using two microphones and that other examples are possible.

At step 322, a user utters a trigger phrase (e.g., OK GOOGLE NOW) seamlessly followed by a command (WHAT IS THE WEATHER TODAY?). In this example, the trigger phrase and command are collectively labeled as 302. A first microphone 352 and a second microphone 354 (PDM microphone) detect parts of the complete phrase (e.g., the trigger and command in the example above). The first microphone 352 is in a low power sensing mode and all signals in this mode are buffered before being output, consequently introducing a buffer delay 324 (e.g., 256 milliseconds). During this delay time, a time period 304 exists at the output of the first microphone 352 where no audio is being supplied. At time 326, the start of the audio output of the first microphone 352 occurs. As mentioned, the buffer delay is approximately 256 milliseconds and the 256 millisecond delayed output occurs at the output of the first microphone 352 during period 306.

Another delay 328 (in this case an approximately 100 millisecond delay) may be introduced by the trigger phrase recognition algorithm in the processor (e.g., codec, applications processor, or digital signal processor to mention a few examples). The trigger phrase recognition algorithm compares the received audio to a predefined trigger word or phrase, to determine whether the trigger word or phrase has been uttered. The delay 328 may occur after time 330, which is the end of the delayed version of the trigger phrase. At time 332, after an approximately 256 plus 100 millisecond delay, a beep (or other signal) is emitted or presented to the user signifying that the trigger phrase has been detected. In some examples, no beep may be used and in other examples the "beep" may be inaudible to humans. This signal may be a marker used in later processing and may be removed before stitching together the various speech segments.

At time 334, the second microphone 354 is turned on. Prior to the second microphone 354 being turned on, a time period 304 exists at its output where no audio is being produced.

At time 336, the first microphone 352 is turned off a predetermined time after turning on the second microphone 354. The predetermined time may be 256 milliseconds (the buffer delay of the first microphone 352) plus x, where x is a time period 338 of overlapping speech segments that is used to determine the acoustic delay between microphones 352 and 354. As shown here in this example, x relates to the phrase "E WEA" because "E WEA" is the audio that has been received at both of the microphones 352 and 354. In these regards, the processor can first determine the common audio information received, and then use that to calibrate the microphone signals. This common time period (in this case, the length in time of the phrase "E WEA") is the value of x.

At step 340, the first microphone 352 is quickly or immediately turned on after a very small (e.g., after an approximately 20 millisecond delay) to operate in a normal processing mode. By normal processing or operating mode, it is meant that the microphone 352 does not buffer the incoming signal, but passes data through without buffering the data. In one example, normal operating mode may be entered by applying a clock signal when applying the power signal, while in low power mode no clock signal is applied, till acoustic activity is detected.

Figure 4:
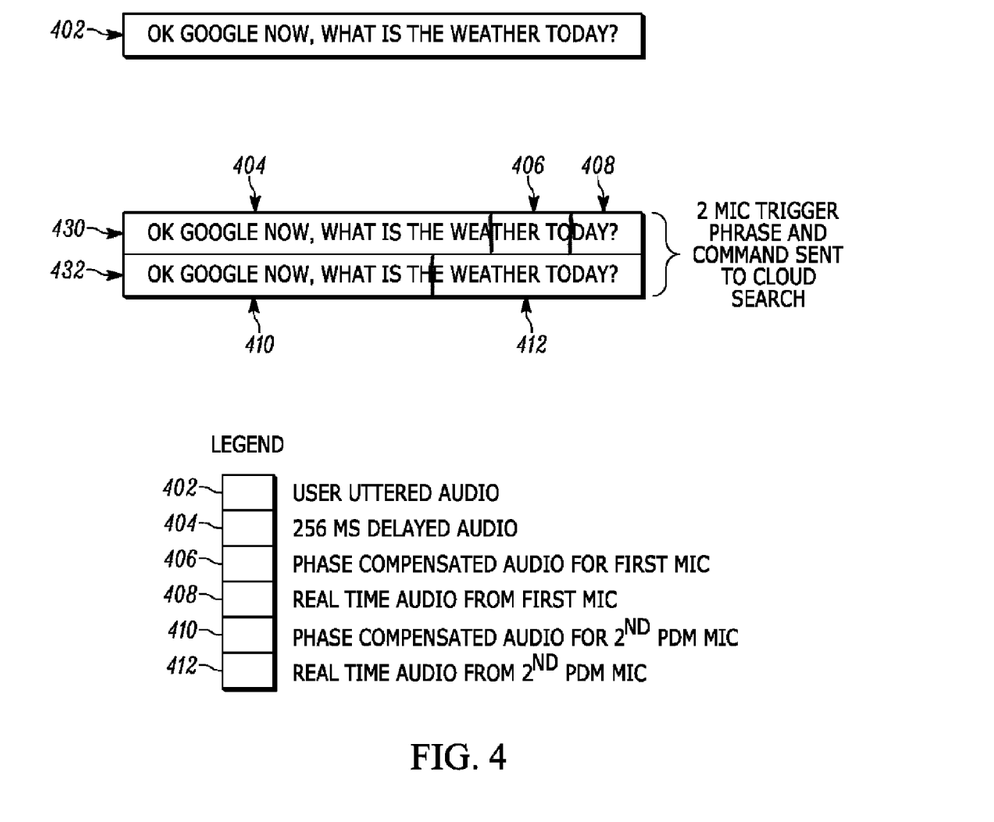
FIG. 4 comprises the time line showing an example of an audio buffer catch-up approach.

Referring now to FIG. 4, further explanation of assembling the phrases detected at two microphones 352 and 354 is provided. FIG. 4 illustrates assembling the information together to form the complete phrases 430 and 432 for each of the microphones 352 and 354 respectively. When each of the phrases is assembled, each phrase "OK GOOGLE NOW, WHAT IS THE WEATHER TODAY?" will be complete, but the internal characteristics (e.g., amplitude, acoustic delay) within the phrase may be different for each microphone. These phrases may be used in further processing (e.g., transporting to the 'cloud' for speech recognition in a cellular phone, tablet, or personal computer).

As shown, user uttered audio 402 is in this example OK GOOGLE NOW, WHAT IS THE WEATHER TODAY? There is a large missing segment of missing audio (at period 410) at the second microphone 354. However, the first microphone 352 has obtained this audio at time period 404. Thus, audio (for time period 404) can be used to obtain audio (for time period 410) for the second microphone, after appropriate calibration.

Time period 406 is missing from the first microphone 352. But, the second microphone 354 has obtained this audio and so this can be included in the audio for the first microphone 322.

The first microphone 352 has obtained audio for time period 408 in real time. Consequently, the complete audio phrase (430) ("OK GOOGLE NOW, WHAT IS THE WEATHER TODAY?") has been assembled for the first microphone 352 since time periods 404, 406, and 408 have been filled in.

The second microphone 354 obtains real time audio for time period 412. Consequently, the audio phrase 432 ("OK GOOGLE NOW, WHAT IS THE WEATHER TODAY?") has been assembled for the second microphone 354 since time periods 410 and 412 have been filled in.

In this way, the audio phrases 430 (from the first microphone 352) and 432 (for the second microphone 354) are assembled or stitched together. This processing may occur at a codec, application processor, or digital system processor to mention a few examples. The phrases 430 and 432 may be further processed by other processing devices as needed.

Preferred embodiments of this disclosure are described herein, including the best mode known to the inventors. It should be understood that the illustrated embodiments are exemplary only, and should not be taken as limiting the scope of the appended claims.

What is claimed is:

1. An audio processor configured to form an electronic representation of an uttered phrase, the processor comprising:
a microphone interface;
the processor configured to:
receive, via the microphone interface, buffered data derived from a first segment of the uttered phrase by a first microphone;
receive, via the microphone interface, first unbuffered data derived from a second segment of the uttered phrase by the first microphone, the first segment different than the second segment;
receive, via the microphone interface, second unbuffered data derived from less than the entire uttered phrase by a second microphone; and
form the electronic representation of the uttered phrase based on the buffered data, the first unbuffered data, and the second unbuffered data.

2. The processor of claim 1, further configured to:
provide a second microphone enablement signal at the microphone interface after receiving at least some of the buffered data at the microphone interface; and
receive the second unbuffered data at the microphone interface after providing the second microphone enablement signal.

3. The processor of claim 2, further configured to:
detect speech in the buffered data; and
provide the second microphone enablement signal after detecting speech in the buffered data.

4. The processor of claim 1, further configured to:
receive the second unbuffered data at the microphone interface after receiving the buffered data;
provide a first microphone clock signal to the microphone interface after receiving the buffered data; and
receive the first unbuffered data at the microphone interface after providing the first microphone clock signal.

5. The processor of claim 4, further configured to:
provide a second microphone enablement signal at the microphone interface after receiving the buffered data at the microphone interface; and
receive the second unbuffered data at the microphone interface after providing the second microphone enablement signal.

6. The processor of claim 5, further configured to:
detect speech in the buffered data received at the microphone interface;
provide the second microphone enablement signal after detecting speech.

7. The processor of claim 4, further configured to:
calibrate the first microphone and second microphone based on common information received from the first microphone and the second microphone at the microphone interface.

8. The processor of claim 1, further configured to:
provide a first microphone deactivation signal and subsequently provide a first microphone reactivation signal at the microphone interface while receiving the second unbuffered data at the microphone interface; and
receive the first unbuffered data at the microphone interface after providing the first microphone reactivation signal.

9. The processor of claim 8, further configured to:
provide the first microphone deactivation signal after a delay period occurring when the second unbuffered data is received at the microphone interface.

10. The processor of claim 1, further configured to:
form a second electronic representation of the entire uttered phrase based on the buffered data and based on the second unbuffered data.

11. A processor configured to form multiple electronic representations of a phrase that is uttered by a user and received at different microphones, the processor comprising:
a microphone interface;
the processor configured to:
receive buffered first data from a first microphone that is being operated in a low power sensing mode, the buffered first data having been buffered at the first microphone;
determine whether speech is present in the buffered first data received from the first microphone;
activate a second microphone when speech is determined to be present in the buffered first data;
subsequently receive unbuffered second data from the second microphone in real time, the unbuffered second data not having been buffered at the second microphone;
deactivate the first microphone after a delay period while continuing to receive the unbuffered second data in real time from the second microphone, the deactivation causing the first microphone to fail to sense a part of the phrase, the unbuffered second data including the part of the phrase not sensed by the first microphone;
re-activate the first microphone, the re-activation causing the first microphone to operate in a normal operating mode, wherein the first microphone produces unbuffered first data when in normal operating mode;
form a first electronic representation of the entire phrase, the first electronic representation being assembled from the buffered first data, the unbuffered second data, and the unbuffered first data; and
form a second electronic representation of the entire phrase, the second electronic representation being assembled from the buffered first data and the unbuffered second data.

12. The processor of claim 11, wherein the phrase includes a trigger and a command, and wherein the first data is different than the second data, the processor further configured to:
determine whether speech is present by determining whether a trigger is present in the buffered first data received from the first microphone,
activate the second microphone when the trigger is determined to be present in the buffered first data.

13. The processor of claim 11, wherein the first microphone and the second microphone are micro electro mechanical system (MEMS) microphones.

14. The processor of claim 11, wherein the first microphone includes a voice activity detector.

15. The processor of claim 11, wherein the second microphone is a pulse density modulation (PDM) microphone.

16. A system of forming an electronic representation of an uttered phrase received at different microphones, the system comprising:
a first microphone that includes a buffer, wherein the buffer at the first microphone temporarily stores data corresponding to at least some of the phrase;
a second microphone;
a control apparatus coupled to the first microphone and the second microphone, the control apparatus having an output, the first microphone forming first data including buffered data corresponding to a first segment of the phrase and unbuffered data corresponding to a second segment of the phrase, the control apparatus further configured to cause the second microphone to provide unbuffered second data, the second data corresponding to less than the entire phrase, the control apparatus configured to form a first electronic representation of the entire phrase from selected portions of the first data and the second data, the first electronic representation transmitted at the output.

17. The system of claim 16, wherein:
the first data is different than the second data,
the first microphone includes a voice activity detector and is operated in a low power sensing mode when the buffer at the first microphone temporarily stores data,
the control apparatus configured to maintain the second microphone in a deactivated mode until the control apparatus detects speech in the buffered data, and when speech is detected, cause the second microphone to provide unbuffered second data to the control apparatus.

18. The system of claim 17, wherein:
after activating the second microphone, the control apparatus configured to deactivate the first microphone and then re-activate the first microphone to operate in a mode where data is not buffered,
the first data including buffered data and unbuffered data from the first microphone, the first data corresponding to less than the entire phrase, the control apparatus configured to form the first electronic representation of the entire phrase from the first data and at least a portion of the second data, and the control apparatus configured to form a second electronic representation of the entire phrase from the buffered data and the second data, the control apparatus configured to transmit the second electronic representation at the output.

19. The system of claim 17, wherein the first microphone and the second microphone are micro electro mechanical system (MEMS) microphones.

20. The system of claim 17, wherein the second microphone is a pulse density modulation (PDM) microphone.

21. The system of claim 16, wherein the control apparatus is configured to maintain the second microphone in a deactivated mode until speech is detected in the first data.

22. The system of claim 16, wherein the control apparatus is configured to form a second electronic representation of the entire phrase from selected portions of the buffered data and the second data.

* * * * *